Patented Sept. 27, 1927.

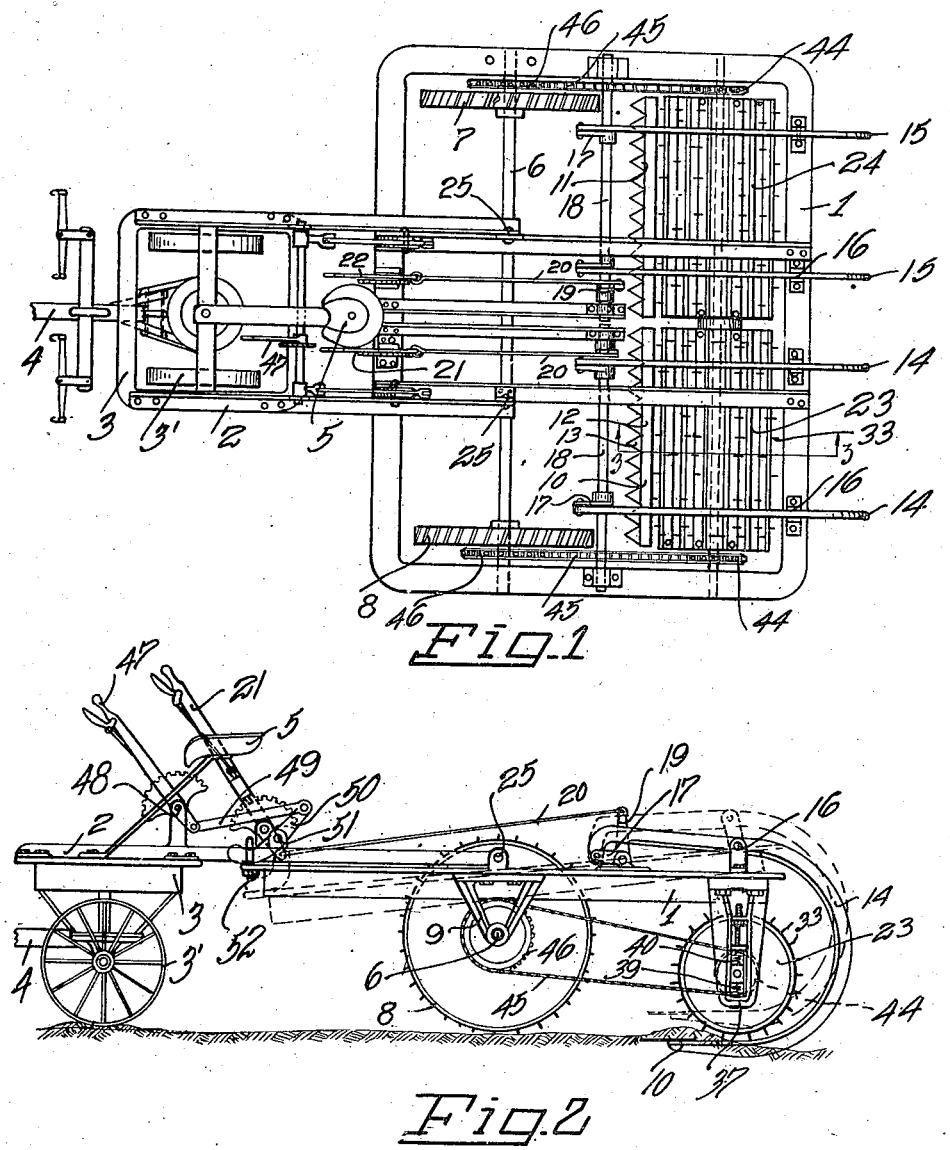

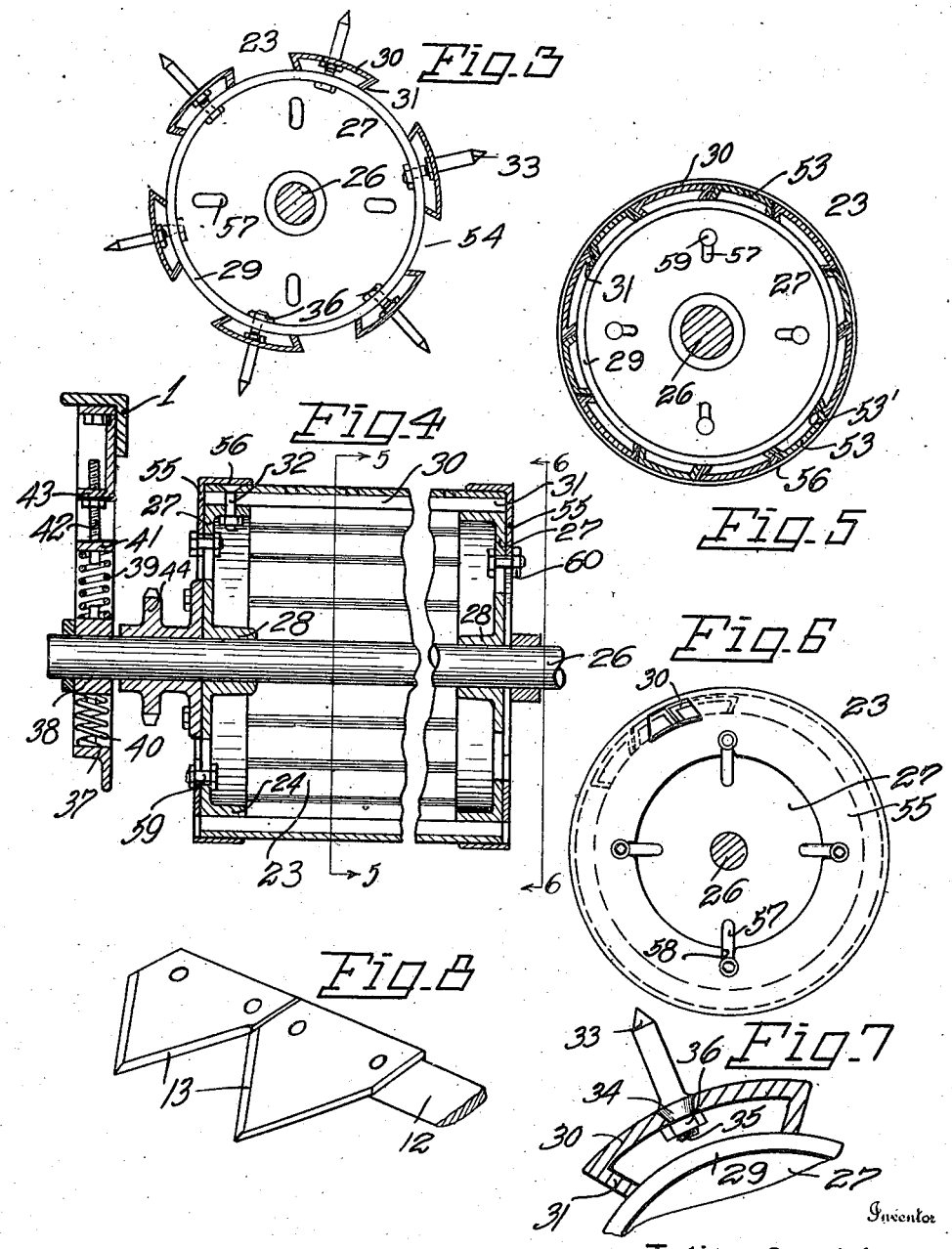

1,643,328

UNITED STATES PATENT OFFICE.

JULIUS YACKLEY, OF SPOKANE, WASHINGTON.

CULTIVATOR.

Application filed January 11, 1927. Serial No. 160,382.

My present invention relates to improvements in cultivators or agricultural implements adapted, in addition to cultivating the soil, for weeding the soil, and at the same time for aerating and mulching the soil in order that moisture may be retained in the cultivated soil. The implement is of the wheeled type and is adapted to cut off weeds below the surface of the soil, then pick up the cut weeds, and deposit them on the cultivated soil. Rotary cultivating drums are provided for breaking up the clods and lumps in the soil, and these rotary drums are adapted for selective use as toothed, rotary harrows or as packing drums or land rollers. Means are provided for facilitating the conversion of the drums for use as harrows or as land rollers, and operating means are provided for the weeding or weed-cutting blades, as well as for the rotary drums, for adjusting them relatively to the soil when in use, or for moving them to inoperative position when not in use.

The invention consists in certain novel combinations and arrangements of parts as will hereinafter be more specifically pointed out and claimed.

In the accompanying drawings I have illustrated one complete example of the physical embodiment of my invention wherein the parts are combined and arranged according to the best mode I have thus far devised for the practical application of the principles of my invention.

Figure 1 is a plan view of the implement embodying my invention, indicated as a horse drawn, four-wheel type cultivator and weeder.

Figure 2 is a view in side elevation of the implement of Figure 1.

Figure 3 is a sectional view at line 3—3 of Figure 1, transversely of one of the rotary drums, showing particularly its spaced ribs and spikes or teeth.

Figure 4 is an enlarged, fragmentary, longitudinal, sectional view of one of the drums equipped as a land roller.

Figure 5 is a transverse sectional view of the land roller of Figure 4 taken on line 5—5.

Figure 6 is an end view, partly broken away for convenience of illustration at line 6—6 of Figure 4 showing the shaft in section.

Figure 7 is an enlarged detail sectional view showing the relation of one of the harrow ribs to the drum.

Figure 8 is a detail perspective view of a portion of one of the weed-cutters, used beneath the soil.

In the preferred form of my invention I utilize a rectangular frame as 1, which is the main frame, together with a front frame 2, and the latter is supported by the pony or steering truck 3 having usual wheels as 3'. A tongue 4 and draft connections are indicated for hitching horses to the implement, and the driver sits in the seat 5 which is rigid with and supported from the front, narrow frame 2.

The main frame is tiltable as will be described, and is supported by means of the driving shaft 6 and two traction wheels 7 and 8, the shaft being journaled in shaft hangers 9 as usual.

A pair of sub-soil or weed cutters indicated as 10 and 11 in Figures 1 and 2 are employed, one at each side of the longitudinal center of the implement, located at the rear of the traction wheels, and independently adjustable relatively to the surface of the ground. These sub-soil weed cutters are also adapted to be withdrawn from operative position by a tilting movement of the main frame as will be described.

Each weed-cutter comprises a horizontal, transversely extending, flat cutter bar 12 to which the teeth or cutters 13 are affixed and these teeth as best seen in Figure 8 are provided with beveled, angularly disposed cutting edges 13 which pass through the soil beneath its surface and cut the roots of the weeds.

Each cutter, as 10 and 11, is suspended from the main frame by a pair of gooseneck beams as 14 and 15, and the cutter bars of the respective cutters are secured to the pairs of beams at their lower ends. The upper ends of these pairs of beams project forwardly over the rear end of the main frame and are fulcrumed as at 16 on the top part of the main frame. The front ends of these fulcrumed beams are pivoted by means of crank arms or rock arms 17 to the pair of rock shafts 18, 18 that are journaled in bearings alined transversely of the implement and secured on the top of the main frame. The rock shafts 18 are independently rocked, each one by a crank arm 19 thereon, a connecting rod 20 to the respective levers 21 and 22 located near the seat 5 and convenient for access by the driver occupying the seat. Thus by manipulating the levers 21 and 22, independently, the cutters may be turned on their pivots 16 to adjust them with relation to the surface of the soil and to the roots of the weeds.

At the rear of the cutters are located a pair of axially alined, rotary drums 23 and 24 and suspended beneath the main frame. These rotary drums and the weed cutters may be elevated from operative position to the dotted line position in Figure 2, when not desired for use, by tilting the main frame on pivots 25. As seen in Figures 1 and 2, the rear end of the front frame projects rearwardly over the front portion of the main frame and the rear end of the front frame is pivotally connected to the main frame. The front end of the main frame is thus designed to be depressed and the rear end of the main frame to be elevated by tilting this main frame on the driving shaft of the implement with the traction wheels as supports for this movement. The lever mechanism for this tilting movement will later be described.

The two rotary drums are of similar construction and operation and therefore a description of one will suffice for both. Each drum has a shaft 26 and two heads 27 with hubs 28 fixed to the shaft, and the heads are provided with annular, interior flanges 29.

The flanged heads of the drum are connected by longitudinally extending spaced ribs 30, preferably of pressed metal and fashioned with inner end-flanges 31 that rest on the flanged heads of the drum and the ribs are secured to these flanged heads by bolts 32. Each rib is provided with spaced spikes or teeth 33 projecting therefrom (the teeth of the drum being arranged in staggered formation) and these spikes or studs are secured in the ribs by the use of tapered heads 34 seated in sockets of the ribs. The tapered heads are provided with threaded ends 35 and nuts 36 inside the flanged rib are used to hold the spikes or studs in place. After the bolts 32 have been loosened and the ribs removed from the drum these nuts 36 may readily be removed in order that the spikes or studs 33 may be detached from the ribs.

To compensate for irregularities in the surface of the ground the two rotary drums are provided with resilient bearings for their shafts 26 and the shafts are suspended from shaft-hangers 37 attached, as indicated in Figures 2 and 4 from the underside of the main frame 1 shown as an angle iron in Figure 4. These shaft hangers which are rigid with the main frame are slotted as usual and each provided with a bearing block 38 for a shaft end and the blocks are vertically movable in the slotted hangers between upper springs 39 and lower springs 40. The tension of these springs, and consequently the movement allowed these bearing blocks with their shafts, is adjusted by means of a cap 41 above the spring 39, and a tension-adjusting bolt 42 threaded in the flange 43 of the hanger, and bearing against the cap 41.

At the outer ends of the two shafts 26 driven sprockets 44 are affixed, and chains 45 pass around these sprockets from the driving sprockets 46 on the driving shaft 6, and by this means the drums are revolved as the implement travels forward.

For tilting the main frame I provide an operating lever 47 on the rock shaft 48, and from this rock shaft which has rock arms 48' thereon, links 49 connect these arms with rock arms or crank arms 50. These crank arms are pivoted at 51 to the front frame and at 52 to the main frame, to cause the dotted line movement of the main frame when the lever 47 is operated.

The rotary drums may readily be converted for use as land rollers or rotary packers for the soil after the studs or spikes 33 have been removed and the spikeless ribs replaced on the heads to form portions of the drum. For this purpose, detachable ribs 53 are added to the rotary drums and these are slid into place, in the dovetail grooves 54 between ribs 30, from one end to the other of the drum, leaving the ends of the added ribs flush with the ends of the ribs 30. These ribs 53 have longitudinally extending edge flanges 53' that flare outwardly and slide into frictional contact with the flanges 31 of the ribs 30 in the dovetail grooves between fixed ribs 30. The alternately fixed ribs 30 and attached ribs 53 thus form a drum or roller in the form of a cylinder whose entire wall surface is closed, adapting the drum as a land roller or packing roller.

The attached or added ribs 53 are retained against longitudinal displacement by means of end caps 55 in the form of open-center rings, having annular flanges 56 of a size to fit over the ends of the ribs forming the ends of the drums. For securing these caps in place the drum heads are provided with radial slots 57 and the inner edge of the open-center cap is provided with complementary notches 58. By means of bolts 59 and nuts 60 passing through the slots and notches, the caps are rigidly attached to the heads.

Having thus fully described my invention, what I claim as new and desire to secure by Letters Patent is:—

1. In a wheeled implement, the combination with a front frame and a tiltable main frame having shaft hangers, and a pair of axially alined rotary drums journaled in said hangers transversely of the implement, goose neck hangers having fulcrums on the main frame and weeding cutters secured to said hangers and located below the drums, means for adjusting the hangers and cutters with relation to the drums and means for tilting the main frame on its fulcrum.

2. In a wheeled implement the combination with traction wheels and an axle, and a front wheeled-frame, of a main frame pivoted to the front frame and tiltably supported on the axle, means for tilting the main frame on the axle as a fulcrum, a pair of axially alined rotary drums journaled in the main frame, gooseneck hangers having fulcrums on the main frame and extending forward beneath the drums, cutters on the forwardly extending ends of the hangers, and means for adjusting the hangers on their fulcrums.

In testimony whereof I affix my signature.

JULIUS YACKLEY.